April 7, 1931.   O. ROBERGE   1,799,252
COMBINED PERFUMER AND DISINFECTOR
Filed June 5, 1925
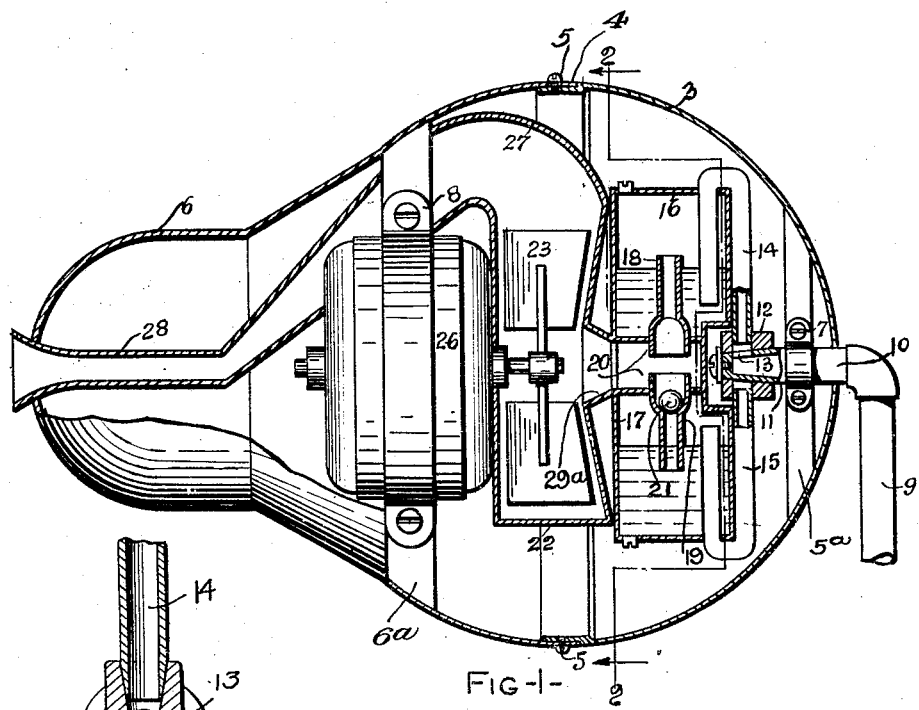
FIG-1-
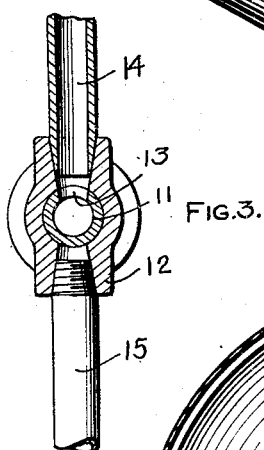
FIG.3.
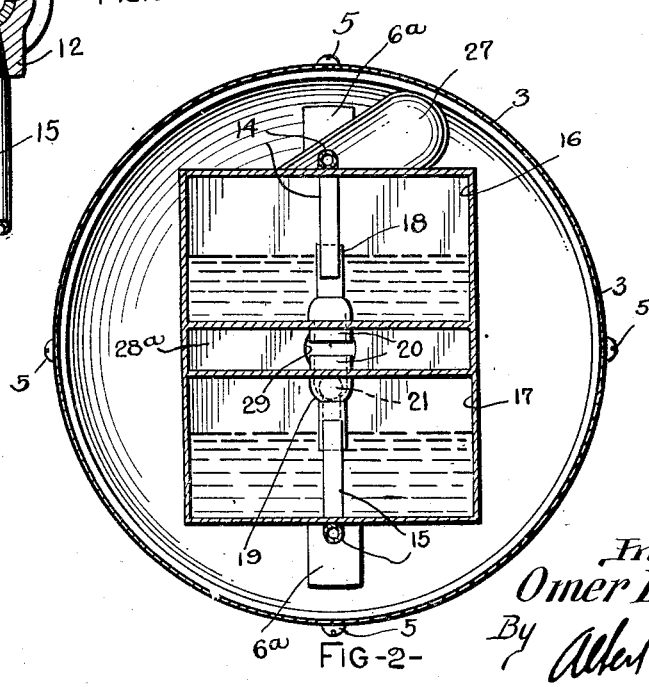
FIG-2-
Inventor:
Omer Roberge
By Albert Jowvnis
Attorney Patented Apr. 7, 1931

1,799,252

UNITED STATES PATENT OFFICE

OMER ROBERGE, OF SOREL, QUEBEC, CANADA, ASSIGNOR TO ULRIC LA GARDE, OF MONTREAL, CANADA

COMBINED PERFUMER AND DISINFECTOR

Application filed June 5, 1925. Serial No. 35,234.

My invention relates to improvements in a combined perfumer and disinfector, especially adapted to disinfect or perfume rooms or any living quarters where such treatment is desirable.

The object of my invention is to devise an apparatus of this nature of simple form, easily operated and very effective in operation.

A further object is to combine the apparatus with a motor in such a way that the whole may be enclosed in a casing of pleasing appearance, which may be easily suspended on the wall of a room, out of the way of the occupants.

In the accompanying drawings, similar reference symbols refer to same parts in the two views:

Figure 1 is a longitudinal sectional view taken through the device forming the subject matter of the present invention and showing parts thereof in elevation.

Figure 2 is a sectional view taken approximately on line 2—2 of Figure 1, looking in the direction of the arrows.

Figure 3 is an enlarged view with parts in section and showing the valve means and connection of the air inlet pipes thereto.

The apparatus comprises a casing 3, in the present instance made in two parts and joined at 4 by means of suitable screws 5. The rear part of said casing is preferably semispherical in form, while the front portion terminates into an oblong projection 6 to receive the outlet nozzle of the perfumer.

Bridging the casing are brackets 5a and 6a to which are secured clamps 7 and 8 respectively as shown, and for the purpose of securing operating parts of the device in the casing and these parts will be later described.

Two tanks 16 and 17 are mounted opposed to one another inside the spherical portion of the casing. They are provided with air inlet pipes 14 and 15, as well as with vapor outlets 18 and 19.

The tanks 16 and 17 are spaced apart and the vapor outlets 18 and 19 which are arranged therein have enlarged confronting outer ends providing cups projecting through the tanks in alignment with each other as best shown in Figure 1 of the drawing. The cups are ground to provide seats for a ball valve 21 which is mounted to move by gravity from one seat to the other. While I have shown the cups of the vapor outlets 18 and 19 spaced apart, it is obvious that they can be disposed in contacting engagement, and if such was the case, an opening would be provided to allow for the passage of vapor therefrom, but in any event the space between the cups is not great enough to allow for the escape of the ball valve 21. The tanks 16 and 17 are supported in spaced relation with respect to each other by being soldered or otherwise secured to the air inlet pipes 14 and 15 which are substantially U-shape in configuration, and the inside branches of the inlet pipes extend a considerable distance into the tanks, while the outside branches are suitably connected to a valve casing 12, in which is mounted a conical valve 11 having an opening 13 which provides an outlet as will be apparent upon inspection of Figure 3. The valve 11 is connected to an air pipe 10 leading outside of the casing 3, this pipe terminating in a pipe 9 positioned at right angles thereto. Pipe 10 is rotatably held inside the casing 3 by means of the clamp 7, as shown.

Back of the tank is a casing 22, intended to receive a fan, the casing 22 being connected by soldering or otherwise to a motor casing 26 which is supported by the clamp 8. The shaft of the motor carries a fan 23, as shown. Fan casing 22 is provided with an outlet 27 leading back of motor 26 to an outlet nozzle 28.

It will be understood, as previously stated, that the mounting of the tanks inside the casing is disposed so that the outlets 18 and 19 are in line and distanced apart sufficiently to allow the passage of air without, however, leaving enough space to permit the ball valve 21 to escape.

The walls of the tanks may be made continuous and the wall 28a on the side adjacent the fan, is provided with an opening 29 for the passage of air. The wall of the casing 22 adjacent the tanks 16 and 17 is formed to provide a flared portion 29a connected with the wall 28a about the openings 29 so as to provide a continuous passageway from the space between the tanks 16 and 17, through the opening 29 and flared portion 29a, to the fan casing 22, as clearly shown in Figure 1 of the drawings.

In operation, the perfumer functions as follows: The casing having been suitably suspended on the wall by means of pipe 9, which may be held in a suitable socket (not shown) so that the emitting nozzle is in a horizontal position, the electric current is turned on, when the fan 23 will create a suction inside the tank which is in communication with the pipes 9 and 14 through the valve 11 and as the fan forms a vacuum in this tank, air will be drawn from the pipes 9 and 14 through the liquid and carry a certain amount of vapor, which will find its way through pipe 18, enlargement 20, opening 29, into the fan chamber 22, outlet 27, and emitting nozzle 28 to the open air.

As previously explained, one of the tanks may contain perfume, the other a disinfectant. When it is desired to vaporize either of these fluids, the casing 3 is turned on pipe 9 until the valve outlet 13 coincides with the pipe leading to the tank containing the liquid desired, the tank not in use resting in the meantime below that in use and closed by ball valve 21, as shown. When it is desired to use the other liquid, the casing is revolved a half turn so as to position the air inlet of the tank desired in communication with the source of air and the valve which formerly closed it will now fall into the seat of the outlet pipe of the tank below.

The apparatus shown and described is one practical example of my invention but I reserve the right to any changes both in the forms and construction of parts coming within the scope of my invention, as covered by the following claims.

What I claim as my invention is:—

1. In an apparatus of the class described, a casing, an air inlet conduit entering said casing, a valve connected to said air inlet conduit inside said casing, a valve casing for said valve rotatable thereon, air outlets comprising pipes connected on both sides of the valve casing and projecting radially therefrom, liquid tanks fastened to said pipes and positioned radially of said valve, air outlets oppositely positioned in said tanks, said outlets having valve seats, and a ball valve mounted to be seated in either of said outlets upon rotation of said tanks to place one or the other substantially in vertical position.

2. In an apparatus of the class described, a revolving casing, a perfuming tank and a disinfecting tank mounted therein, both tanks being positioned in the same plane and distanced apart, said tanks being adapted to contain liquid perfume and liquid disinfectant respectively, outlets for said tanks comprising funnel shaped tubes, the spout portions of which project inside and the funnel portions outside thereof, the said funnel portions being aligned, a ball valve mounted in said funnel portions so as to move freely therein and close either of the said outlets, air inlet means for said tanks, and means to create a vacuum in said tanks so as to cause air to be impregnated with the liquid in one of said tanks which has been set in a substantially vertical position.

3. In an apparatus of the class described a revolving casing, a perfuming tank, and a disinfecting tank mounted therein, both tanks being positioned in the same plane and distanced apart, outlets for said tanks comprising funnel shaped tubes, the spout portions of which project inside and the funnel portions outside thereof, the said funnel portions being aligned, a ball valve mounted in said funnel portions so as to move freely therein and close either of the said outlets, an air inlet common to both tanks, valve means on said inlet to direct the air into either of said tanks, and means to create a suction in said outlets to cause the air to enter one of said tanks which has been set in a substantially vertical position so as to be charged with liquid to form a vapor.

4. In an apparatus of the class described, a casing, perfuming and disinfectant tanks mounted therein and adapted to be rotated as a whole therewith, an air inlet, a valve in said inlet, a valve casing, and air conduits connected to said valve casing to lead the air to said tanks and positioned to direct the air into either of said tanks by the rotation of said casing so as to place one or the other of said tanks in a vertical position.

In testimony whereof, I have hereunto affixed my signature, this 31st day of December, 1923, at Montreal, Quebec.

OMER ROBERGE.